*INVENTOR.*
WALTER L. STURGEON
BY
ATTORNEY

United States Patent Office 3,608,218
Patented Sept. 28, 1971

3,608,218
SNAP-TYPE RESILIENT RETAINER FOR
EXCAVATING TEETH
Walter L. Sturgeon, Los Altos, Calif., assignor to
Pengo Corporation, Sunnyvale, Calif.
Filed Mar. 24, 1969, Ser. No. 809,702
Int. Cl. E02f 9/28
U.S. Cl. 37—142A                                    4 Claims

ABSTRACT OF THE DISCLOSURE

A retainer for an excavating tooth formed with a slot extending forwardly from the proximal end to divide the tooth into two generally rectangular cross-section prongs. The tooth is received in a holder having a rectangular recess which fits around the exterior of the tooth. The retainer is a three-part pin having a resilient core and hard faces on either side. The retainer fits through aligned holes in the top and bottom of the holder and between the prongs. Buttress-type projections on the facing edges of the prongs are engaged by the retainer to prevent withdrawal of the tooth while the retainer is in position. The shape of the projections permits the tooth to be driven into place while the retainer is in place in the holder.

---

This invention relates to a new and improved snap-type resilient retainer for excavating teeth. More particularly, the invention relates to means to hold an excavating tooth in its holder under conditions of extreme vibration and heavy stresses. A typical example in which the present invention may be incorporated is a pavement mixing machine wherein the soil underlying the road to be paved is dug up by excavating teeth disposed extending radially from a shaft which rotates about an axis transverse to the direction of movement of the machine and is gradually lowered to enable the teeth to excavate the subsoil to a considerable depth. Other uses of the invention are, of course, contemplated.

A feature and advantage of the invention is the fact that teeth may be rapidly installed and removed as required. Since numerous teeth are installed on a pavement mixing machine, reduction in down time of the machine required to change teeth is a considerable saving in equipment cost and stand-by time of workmen.

An important feature of the invention is the fact that the retainer has a resilient portion which causes the retainer to continuously engage projections on the tooth. Because of the resiliency of the engagement of the retainer with the tooth, the tendency of a retainer to be displaced under repeated vibration is overcome. One of the undesirable features in the use of metal-to-metal contact taper pins and keys frequently used to retain teeth in place is the fact that the members are subject to dislodgement due to vibration. This undesirable feature is overcome in accordance with the present invention because of the resilient backup of the metal-to-metal contacts.

Another feature of the invention is the fact that there is a hard facing on the retainer which engages projections on the tooth. The hard facing resists wear. On the other hand, the resilient portion of the retainer is protected against abrasion because it does not touch the tooth.

Still another feature of the invention is the fact that the tooth may be installed in its holder with the retainer in position in the holder. Hence when teeth are replaced, the retainer may be removed so that the tooth may be driven from its socket. Thereupon the retainer is replaced and later a new tooth or repaired tooth may be driven into the socket without replacing the retainer.

Other objects of the present invention will become apparent upon reading the following specification and referring to the accompanying drawings in which similar characters of reference represent corresponding parts in each of the several views.

Figure 1:
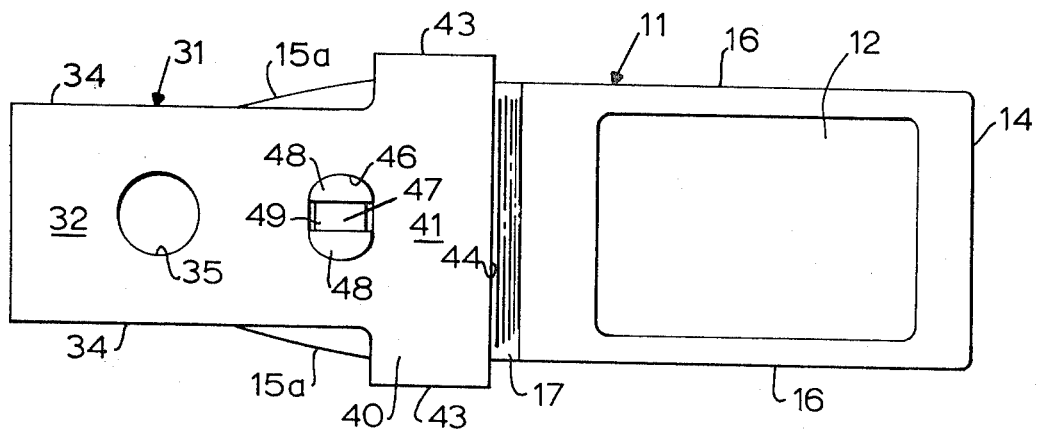
Figure 2:
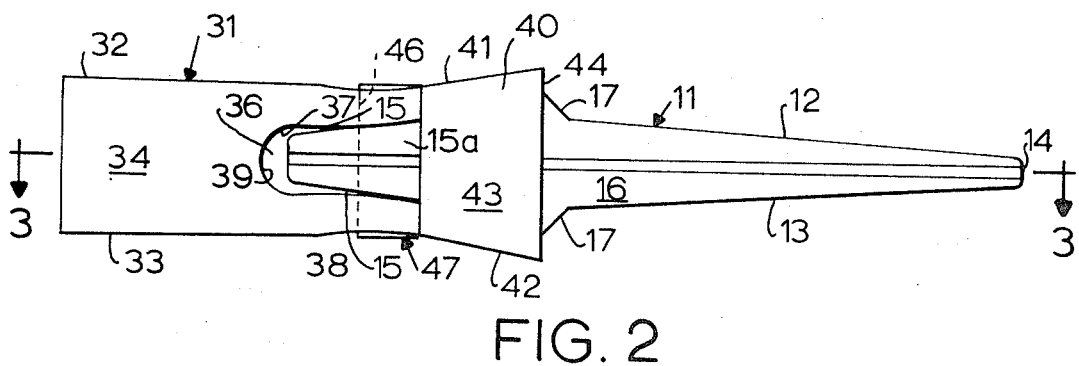
Figure 3:
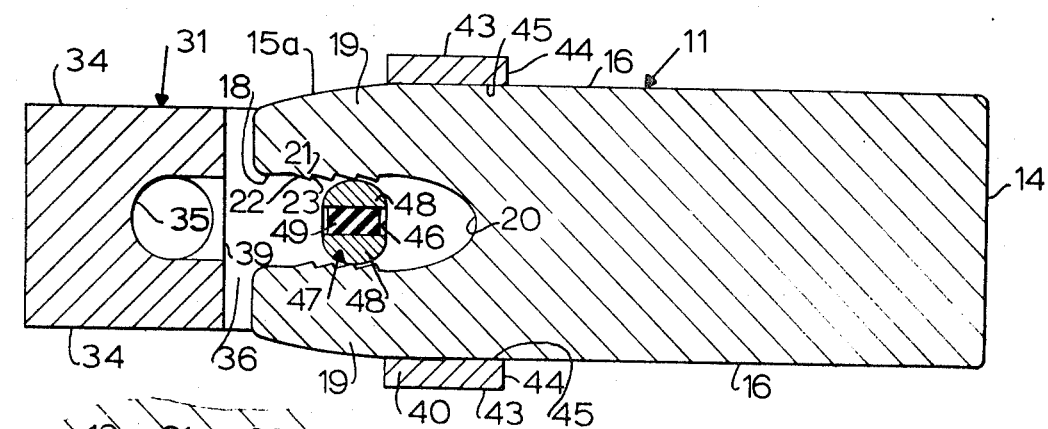
Figure 4:
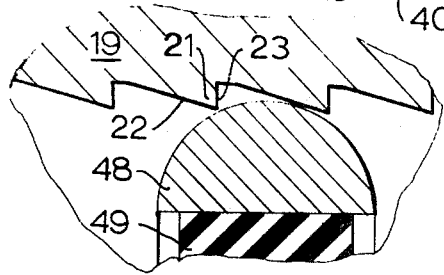

In the drawings:
FIG. 1 is a top plan view of the tooth, holder and retainer.
FIG. 2 is a side elevation thereof.
FIG. 3 is a sectional view taken substantially along the line 3—3 of FIG. 2.
FIG. 4 is an enlarged fragmentary plan view of a portion of FIG. 1.

A typical tooth 11 in which the present invention may be used has forwardly converging top and bottom surfaces 12, 13 and a truncated transverse working edge 14. The sides 16 are substantially vertical and perpendicular to edge 14. Toward the rear of the blade portion which has thus been defined, the tooth is formed with top and bottom protrusions 17 which limit inward movement of tooth 11 relative to its holder and transmit the forces applied to the tooth to the holder. Extending forwardly from the proximal end of the tooth is a generally rectangular slot 18 which terminates in a forward end 20, and which divides the proximal end of the tooth into two prongs 19. Top and bottom proximal surfaces 15 of each prong 19 converge rearwardly and the side edges 15a curve inwardly-rearwardly. The edges of prongs 19, facing slot 18, are formed with a plurality of projections or roughened surfaces 21, here shown as four in number on each side of slot 18. Preferably, each projection 21 is formed in a "buttress-like" shape. Thus the rearward flank 22 of each said projection is slanted rearwardly-outwardly at an angle of about 30°, and the forward flank 23 extends outward at an angle of approximately 90°. The purpose of the buttress shape is to facilitate installation of the tooth in its holder when the retainer hereinafter described is still in place, and further to deter unintentional dislodgement of the tooth from its holder.

A preferred holder 31 with which the invention is used, has slightly forwardly converging top and bottom surfaces 32, 33 and vertical side edges 34 and is formed with hole 35 which extends from top to bottom and is used to fasten the holder in place in the equipment in which it is installed.

Forward of hole 35, holder 31 is formed with a forward extending slot 36 to receive the proximal end of the tooth. The top and bottom walls 37, 38 of slot 36 are approximately horizontal and the rearward end 39 interconnects the top and bottom surfaces. At the forward end of holder 31 is a transverse strap 40, the top and bottom forward surfaces 41, 42 of which are slanted upwardly-forwardly and sides 43 diverge outwardly-forwardly. Strap 40 terminates in a transverse vertical end 44. The sides 43 are approximately vertical and are wider than tooth 11. Thus protuberances 17 seat against strap 40. Vertical walls 45 on the inside of the strap are spaced apart to receive the proximal end of the tooth 11 therebetween.

An oval hole 46 is formed extending through holder 31 from top to bottom immediately behind strap 40, 42, said hole 46 being in alignment with the slot 18 when the tooth is fully seated in the holder. Retainer 47 is received in hole 46. The retainer is formed of three parts. The outer parts 48 are steel and are semi-cylindrical, while the inner part 49 is formed of a resilient material such as rubber and is rectangular. The resilient portion 49 permits the metal portions 48 to flex inwardly, it being observed that the width of portion 49 is slightly less than the diameter of hole 46 and hence the retainer does not normally slip out of hole 46. When retainer 47 is in position in hole 46, the metal portions 48 engage projections 21 of the tooth. Any force tending to pull tooth 11 forwardly relative to holder 31 is resisted in that the projections engage the retainer, thereby limiting forward movement of the tooth. This function is particularly effective in that the forward flanks 23 are substantially transverse to the direction of withdrawal of tooth 11.

One means for installing tooth 11 in holder 31 is to remove retainer 47, insert the tooth in place and then drive retainer 47 downward through hole 46. This operation is made possible in that the inner portion 49 flexes. Once the retainer is in place, it engages the projections 21 and prevents removal of the tooth. Alternatively, with the retainer 47 already in place, tooth 11 is installed by driving working edge 14 rearwardly by hammer blows, or the like, which cause the resilient portion 49 of the retainer 47 to flex to permit the tooth to be driven securely in place even while the retainer is in position.

When it is necessary to remove tooth 11, it is first necessary to remove retainer 47. Removal of retainer 47 is readily accomplished by driving the same out of the hole 46, the resilient portion 49 flexing to permit such operation.

What is claimed is:

1. In combination, a tooth having a distal portion formed with a cutting edge and a proximal portion, said proximal portion having a slot from top to bottom extending forwardly from the proximal end of said tooth to divide said proximal portion into two prongs, the surfaces of said prongs facing said slot being formed with roughened surfaces having a buttress-like shape with surface elements slanted both rearwardly-outwardly and transversely outward; a holder formed with a forwardly opening recess to receive said proximal portion, said holder formed with aligned top and bottom holes, said holes being in registry with said slot in the assembled position of said tooth and holder; and a retainer fitting through said holes and slot, said retainer having opposed hard face members and a resilient member between said face members biasing said face members apart and into frictional engagement with the sides of said holes sufficient to prevent unintentional dislodgement of said retainer from said holes, said face members engaging said roughened surfaces to restrain dislodgement of said tooth from said holder, said resilient member being sufficiently flexible to permit movement of said face members toward each other so that said roughened surfaces can move past said face members when the proximal end of said tooth is forced into said recess with said retainer in place in said holes.

2. The combination of claim 1, in which each said face member has an arcuately curved outer surface and each said hole is substantially complementary to the overall cross-section of said retainer but slightly smaller than the unstressed shape of said retainer, whereby when said retainer is inserted through said holes it is frictionally retained against unintentional dislodgement.

3. The combination of claim 1, in which the top, bottom and outside edges of said prongs slant inwardly-rearwardly and said recess is shaped complementary to said tops and bottoms of said prongs.

4. The combination of claim 3, in which said holder is formed with a transverse strap surrounding said tooth at about the location of the forward end of said slot, said strap engaging the outside edges of said prongs, the sides of said recess being open rearwardly of said strap.

References Cited
UNITED STATES PATENTS

| | | | |
|---|---|---|---|
| 1,845,677 | 2/1932 | Mekeel | 37—142 |
| 1,951,988 | 3/1934 | Mekeel | 37—142 |
| 2,716,822 | 9/1955 | Launder et al. | 37—142 |
| 2,940,192 | 6/1960 | Lattner | 37—142 |
| 3,292,281 | 12/1966 | Petersen | 37—142 |
| 3,305,954 | 2/1967 | Troeppl et al. | 37—142 |
| 3,323,235 | 6/1967 | Petersen | 37—142 |

EDGAR S. BURR, Primary Examiner

U.S. Cl. X.R.
299—92